Nov. 22, 1938.　　　　P. PIERCE　　　　2,137,586
WRAPPING MACHINE GUIDE MEANS
Filed June 10, 1937　　　2 Sheets-Sheet 1

INVENTOR
PAUL PIERCE
BY
Albert L. Ely
ATTORNEY

Nov. 22, 1938. P. PIERCE 2,137,586
WRAPPING MACHINE GUIDE MEANS
Filed June 10, 1937 2 Sheets-Sheet 2
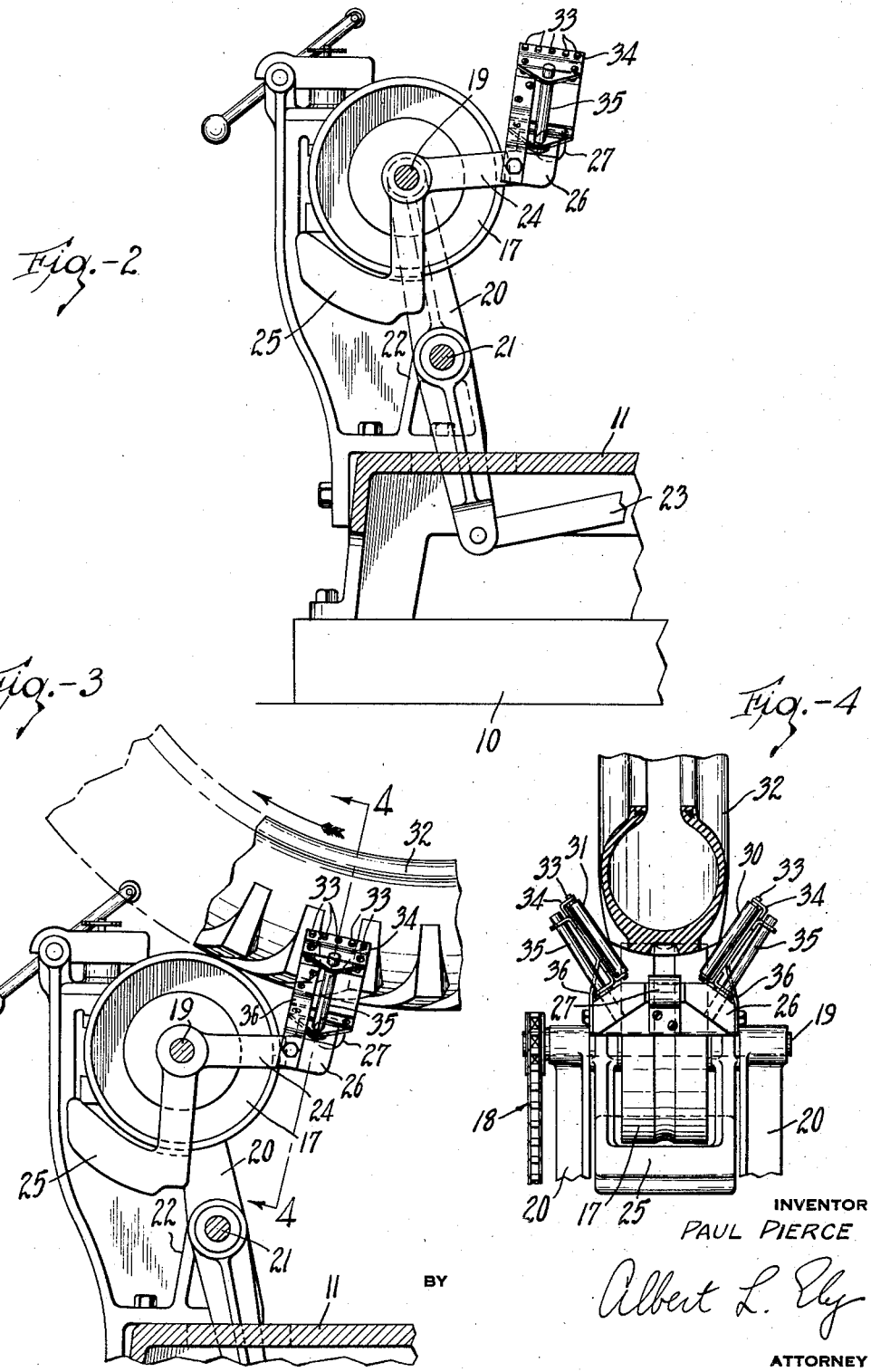
INVENTOR
PAUL PIERCE
BY Albert L. Ely
ATTORNEY Patented Nov. 22, 1938

2,137,586

UNITED STATES PATENT OFFICE 2,137,586

WRAPPING MACHINE GUIDE MEANS

Paul Pierce, Chicago, Ill., assignor to Pierce Wrapping Machine Company, Chicago, Ill., a corporation of Illinois Application June 10, 1937, Serial No. 147,520

3 Claims. (Cl. 242—6)

This invention relates to a wrapping machine of the type adapted to apply a protective wrapping to tire casings and other similar annular articles. More particularly the invention relates to improvements in the guiding and positioning means for tire casings being wrapped in the type of machine described and claimed in my Patent No. 1,635,288, granted July 12, 1927.

In said patent the guiding and positioning means which comprise a pair of upwardly flaring rollers are entirely satisfactory when tires having relatively smooth treads are being wrapped, but when tires of the type now being featured by many tire companies, having rough, heavy lugs, such as the tractor type tire and the like, are being wrapped, said guiding means are unsatisfactory. Since only a single guide roller was arranged to engage each side of a tire being wrapped, these rollers would drop in between the heavy lugs of the tire, tending to hinder rotation of the latter, causing shimmying and uneven rotation, which affected wrapping of the tire.

It is, therefore, an object of this invention to provide a guiding and positioning means which can be satisfactorily used with substantially any type of tire including those having rough lugs.

Other objects and advantages will become apparent from the following description taken in conjunction with the accompanying drawings.

In the drawings:

Fig. 2 is a section taken substantially on line 2—2 of Fig. 1;

Fig. 3 is a similar view with parts broken away, showing a tire in engagement with the guiding means; and Fig. 4 is a section taken substantially on line 4—4 of Fig. 3.

Figure 1:
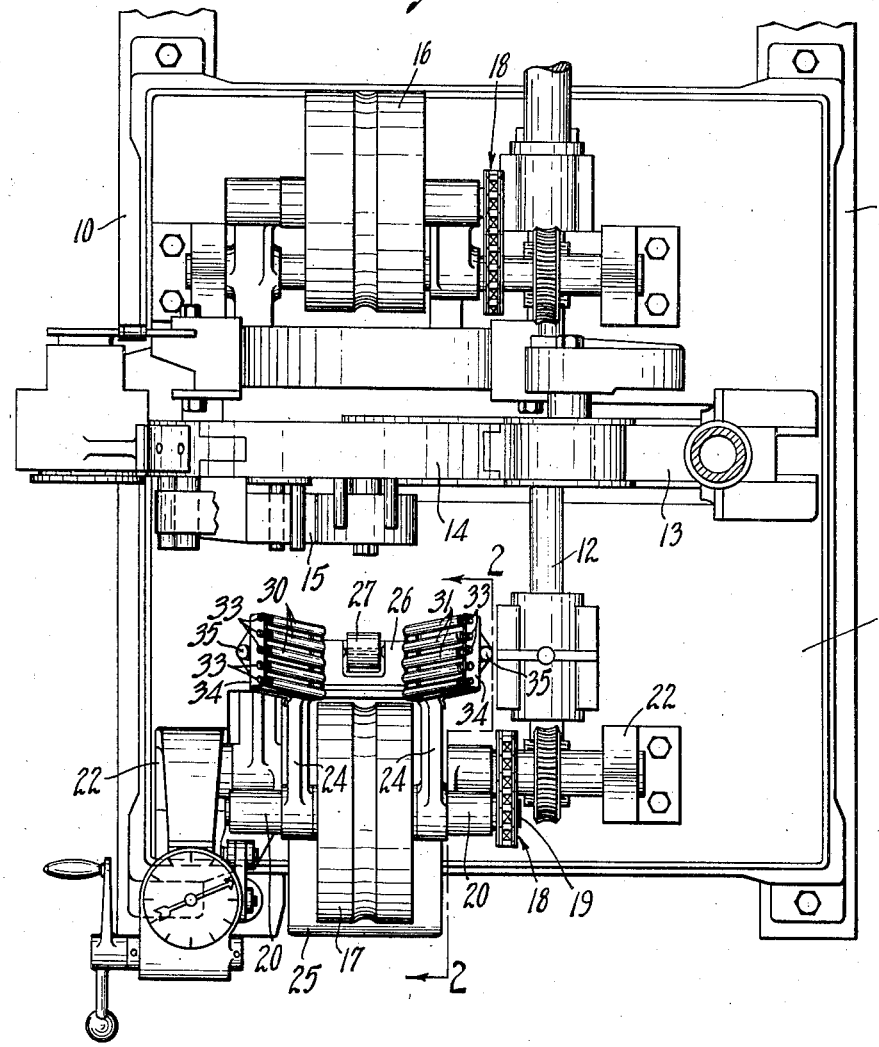
Fig. 1 is a partial plan view, with parts broken away and shown in section, of a machine embodying my novel guiding means.

In illustrating my invention, I have not attempted to show a complete wrapping machine but only as much thereof as will be necessary to understand my improvements. For a complete description of a wrapping machine reference should be had to my aforesaid patent.

Referring now to the drawings, the numeral 10 indicates a foundation which supports a base 11 on which the machine and the various parts are mounted. The machine includes a main drive shaft 12 power driven in any suitable manner which carries a friction wheel 13 adapted to frictionally engage and drive an annular shuttle 14 in the customary manner. Shuttle 14 receives a tire to be wrapped in the usual manner and has secured thereto the necessary equipment for wrapping with paper 15 or the like. The tire is supported in an upright position on drums 16 and 17 which are driven from shaft 12 through connections indicated as a whole by the numeral 18. These drums serve to rotate the tire while it is being wrapped.

Drum 17 is mounted on a shaft 19 which is rotatably supported on suitable arms 20 that are rotatably supported intermediate their ends on shafts 21 which in turn are mounted on brackets 22 extending from the base 11. The lower ends of arms 20 are connected to a rod 23 which may be utilized to rock arms 20 about shafts 21 and thus move drum 17 toward and from drum 16 to accommodate different sizes of tire casings. Outwardly of drum 17, shaft 19 pivotally carries a pair of parallel arms 24 which extend toward drum 16 and have a counterweight 25 associated therewith. The free ends of arms 24 are connected by a plate 26 which carries a central horizontal guide roller 27 for the tire.

The foregoing parts are all fully described in said prior patent and form no part of the present invention except in combination with the improvements to be described. Instead of the single guiding and positioning roller previously arranged to engage each side of a tire, I have provided a pair of sets of small, spaced rollers 30 and 31 to position and guide a tire. As shown, rollers 30 preferably extend in alignment with each other in a plane which lies at an angle with respect to a vertical position, such angle in this instance being about 35° although this may be varied as desired. Rollers 31 extend in similar alignment in a plane lying opposite to the plane of rollers 30, the arrangement being such that the respective sets of rollers flare vertically upwardly and outwardly to receive a tire 32 substantially as shown in Fig. 4. Rollers 30 and 31 are rotatably mounted on spaced shafts 33 carried in substantially U-shaped brackets 34 which are supported on pins 35 suitably secured to plate 26. To prevent brackets 34 from turning on pins 35, a strap 36 is connected between one side of each bracket and plate 26, as clearly shown in Figs. 3 and 4.

The arrangement shown permits ready rotation of rollers 30 and 31 while in engagement with a rotating tire and it is immaterial whether the tire tread is rough or smooth. If tires having heavy lugs, such as shown in Figs. 3 and 4, are being wrapped, the plurality of rollers will bridge the gap between lugs and will not drop into these gaps. Thus, even rotation of the tire is assured at all times and the sets of rollers are not kept in a state of constant agitation as is the case with a single roller.

It is believed to be apparent that my invention has not only provided a means to permit satisfactory wrapping of heavy-lugged tires, but the rollers themselves and the movable parts associated therewith will have a much longer life than single rollers since they are not subjected to the constant jumping movement of the single rollers. It will also be apparent that the number of rollers provided in each set may be varied to suit the conditions under which the machine is operating, and that the invention may be utilized with other types of wrapping machines.

While I have shown and described the preferred form of my invention, it is to be understood that the invention is not so limited, and various modifications may be made within the spirit of the invention and within the scope of the subjoined claims.

What is claimed is:

1. In a wrapping machine for annular articles, a pair of spaced drums for supporting the articles in an upright position, and means pivotally supported adjacent one of said drums to position and guide said articles, said means comprising a pair of sets of rollers, the rollers of one set being arranged in alignment with each other in a plane which lies at an angle to the vertical, and the rollers of the other set being arranged in alignment with each other in a plane lying opposite to the first mentioned plane, the arrangement being such that the respective sets of rollers are in upwardly and outwardly flaring positions.

2. In a wrapping machine for annular articles, the combination with a drum for supporting the articles in an upright position of a pair of sets of rollers pivotally supported adjacent said drum to assist the latter in positioning and guiding said articles, the rollers of one set being arranged in alignment with each other in a plane which lies at an angle to the vertical, and the rollers of the other set being arranged in alignment with each other in a plane lying opposite to the first mentioned plane, the arrangement being such that the respective sets of rollers are in upwardly and outwardly flaring positions.

3. In a wrapping machine for annular articles, the combination with a drum for supporting the articles in an upright position of a pair of parallel arms pivotally mounted, one at each end of said drum; a plate connected between said arms, a pair of spaced pins extending upwardly from said plate, a bracket mounted on each pin, means preventing turning of said brackets on said pins, and a set of rollers carried by each bracket, said sets of rollers being arranged in upwardly and outwardly flaring positions with respect to each other.

PAUL PIERCE.